United States Patent
Oda et al.

(10) Patent No.: US 6,850,016 B2
(45) Date of Patent: Feb. 1, 2005

(54) RARE GAS DISCHARGE LAMP LIGHTING APPARATUS

(75) Inventors: Koji Oda, Hyogo (JP); Takahiro Hiraoka, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/647,387

(22) Filed: Aug. 26, 2003

(65) Prior Publication Data

US 2004/0051483 A1 Mar. 18, 2004

(30) Foreign Application Priority Data

Sep. 12, 2002 (JP) ........................................ 2002-266257

(51) Int. Cl.⁷ .............................................. G05F 1/00
(52) U.S. Cl. ....................... 315/291; 315/219; 315/276; 315/307; 315/360; 315/224; 315/127
(58) Field of Search ................................ 315/291, 276, 315/209 R, 219, 307, 360, 362, 224, 225, 127, 128, 287

(56) References Cited

U.S. PATENT DOCUMENTS 6,483,253 B1 * 11/2002 Okamoto et al. ........... 315/219
6,614,185 B1 * 9/2003 Nishimura et al. ......... 313/607
6,646,389 B2 * 11/2003 Kobayashi ............... 315/209 R
6,710,555 B1 * 3/2004 Terada et al. ................ 315/291

FOREIGN PATENT DOCUMENTS

| JP | 11-312596 A1 | 11/1999 | |
| JP | 2001-167892 A1 | 6/2001 | |
| JP | 2002164184 A | * 6/2002 | ........... H05B/41/23 |

* cited by examiner

*Primary Examiner*—Haissa Philogene
(74) *Attorney, Agent, or Firm*—Rader, Fishman & Grauer PLLC

(57) ABSTRACT

A rare gas discharge lamp lighting apparatus has a power supply, a transformer, a switching element which is in series connected to the power supply and a primary side of the transformer, a rare gas discharge lamp connected on a secondary side of the transformer, and an input terminal for inputting a lamp lighting signal, a controlling circuit for outputting a controlling signal to the switching circuit by calculating at least one of output voltage, output current and output power, and an operating voltage input terminal to which voltage is impressed to initiate an operation of the controlling circuit based on the lamp lighting signal, wherein a delay element is provided between the input terminal and the operating voltage input terminal.

13 Claims, 4 Drawing Sheets

FIG. 3
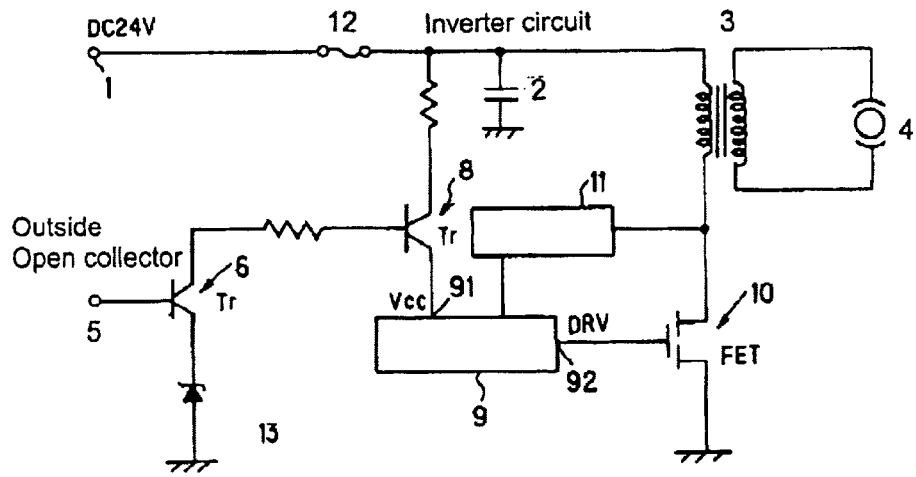
FIG. 4A
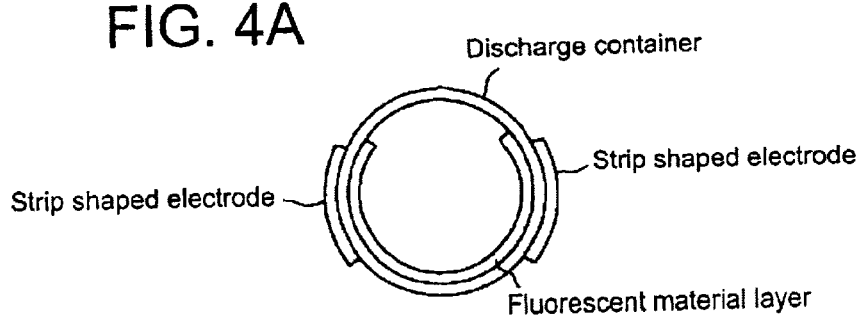
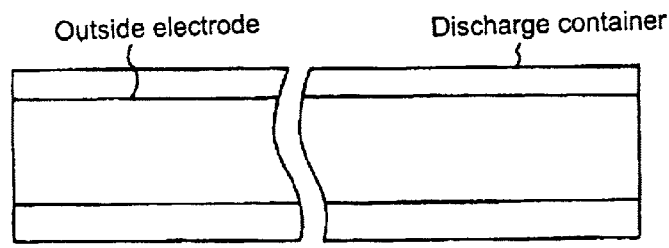
FIG. 4B

A. Smoothing condenser

B. Controlling circuit ON/OFF

C. FET gate signal

D. Lamp ON/OFF

E. DC input current

US 6,850,016 B2

RARE GAS DISCHARGE LAMP LIGHTING APPARATUS

TECHNICAL FIELD OF THE INVENTION

The present invention relates to a lamp lighting apparatus for a rare gas discharge lamp used as a light source for image scanning of a copier, a facsimile and a scanner etc., and particularly relates to a lamp lighting apparatus for a rare gas discharge lamp having an inverter circuit in which lighting is carried out in flyback transformer system.

DESCRIPTION OF RELATED ART

Conventionally, as a discharge lamp used for a scanning light source of a business machine or a backlight for a liquid crystal display apparatus and the like, a rare gas discharge lamp is preferably used wherein rare gas is enclosed inside a glass tube and a pair of approximately strip shaped outside electrodes are provided on the outer surface of the glass tube.

FIGS. 4A and 4B are a diagram showing an example of the structure of the rare gas discharge lamp. FIG. 4A shows a cross sectional view taken in a direction vertical to the axial direction of the rare glass discharge lamp. FIG. 4B is a side elevational view thereof.

As shown in the figures, the rare glass discharge lamp comprises a discharge container made of dielectric such as glass, a pair of strip shaped electrodes made of aluminum and the like which are, in the tube axis direction, approximately entirely disposed on the side surface of the glass tube, and a fluorescent material layer formed on the discharge container.

When voltage is applied between the electrodes of the rare gas discharge lamp from a power feeding apparatus (not shown), input current does not directly flow through the discharge space since the dielectric lies between the pair of electrodes. However, since the dielectric functions as a kind of condenser, current flows and so-called barrier discharge occurs, and then discharge gas emits light whereby ultra-violet light is emitted.

In order to efficiently obtain ultra-violet light by the dielectric barrier discharge, it is desirable to set a certain waiting period after discharge and use the excimer discharge generated before for the next voltage application without extinction thereof.

In general, high frequency alternating current volt is not applied to this type of discharge lamp, but a pulse emission type system in which a constant waiting period for application of current or voltage is set is used.

A system in which flyback voltage of flyback transformer is used is known as a system for pulse emission. In Japanese Laid Open Patent No. 11-312596, such a system is disclosed.

FIG. 5 shows an example of a conventional rare gas discharge lamp lighting apparatus. FIG. 6 is a graph showing a sequence of each part of the rare gas discharge lamp lighting apparatus.

As shown in FIG. 5, when DC 24 V is applied from a direct current power source apparatus (not shown) to an inverter circuit, as shown in FIG. 6A, charged voltage is obtained between both ends of the smoothing condenser wherein the voltage gradually rises based on time constant which is determined by impedance of the direct current power source, the inverter circuit, and the smoothing condenser etc.

In order to normally operate the rare gas discharge lamp lighting apparatus, as shown as D in FIG. 6, an ON signal of lamp ON/OFF signals is input from an input terminal of an open collector provided outside the inverter circuit after a certain time $\Delta t_2$ passes from the time when direct current voltage, DC 24 V is input. Conventionally, the time $\Delta t_2$ is set to longer than 500 ms so as to allow enough time.

When the On signal of the lamp ON/OFF signals is input, a signal level of the outside open collector of the transistor Tr1 falls to the low level whereby a transistor Tr2 turns ON and then, as shown in FIG. 6, voltage Vcc is input to a controlling circuit. When the voltage Vcc is input, an oscillating circuit provided in the controlling circuit operates and a gate signal comprising rectangular waves is output from a DRV terminal of the controlling circuit to a gate of a switching element comprising an FET as shown in FIG. as C 6.

When the gate signal is high, the FET turns ON, and during the period, electromagnetic energy is accumulated on the primary side of the flyback transformer. When the gate signal falls to low level, FET turns OFF, and at the moment, the electromagnetic energy accumulated in the primary side is discharged to the secondary side so as to impress the output voltage induced on the secondary side to the rare gas discharge lamp whereby the rare gas discharge lamp turns on.

After that, the controlling circuit feedback-controls the FET based on an output from a detecting circuit so that drain voltage is maintained to be a certain voltage.

During that time, current input to the inverter circuit, as shown in FIG. 6E, is controlled to, for example, 1 A (one ampere).

SUMMARY OF THE INVENTION

By the way, it is desired to shorten risetime of the light source (a lamp) of a business machine and also it is required to further shorten time to light a lamp in a rare gas discharge lamp lighting apparatus having the above-described inverter circuit.

For example, in the above described rare gas discharge lamp lighting apparatus, to shorten time to light the lamp, it may be required to bring the time $\Delta t_2$ to zero (0). However, in the above mentioned rare gas discharge lamp lighting apparatus, if direct current, DC 24 V is applied, and simultaneously, an ON signal of the lamp ON/OFF signals is output so as to bring the time $\Delta t_2$ to zero (0), the problems described below occur.

FIG. 7 is a chart showing a sequence of each part in an abnormal operation of the above-described rare gas discharge lamp lighting apparatus in case that an ON signal is output and at the same time when direct current DC 24 V is applied.

As shown as A and D in FIG. 7, when an ON signal of the lamp ON/OFF signals is output and at the same time when direct current DC 24 V is applied, as shown as B in FIG. 7, since the controlling circuit starts operating when $V_{cc}=6V$, the controlling circuit starts operating at a point of time $\Delta t_2$ when voltage between both ends of the smoothing condenser is charged to 6V. As a result, as shown as C in FIG. 7, the controlling circuit tries to control the FET so as to apply power to the inverter circuit based on drain voltage detected by the detecting circuit until the drain voltage rises to a predetermined voltage. Because of that, when charging voltage of the smoothing condenser is low, as shown as E in FIG. 7, excessive current flows.

For example, in case that input current is set to one ampere (1 A) when the input voltage to the inverter circuit is 24 V, for power to be the same as that in case of input voltage of 6 V, input current of four ampere (4 A) flows.

Since a current fuse is usually provided on the inverter circuit, and the rated current of the fuse is twice as much as rated current of the apparatus, as a result, the current fuse is melt.

In the conventional rare gas discharge lamp lighting apparatus, when rated voltage DC 24 V is applied as rated voltage, an ON signal of the lamp ON/OFF signals is output after waiting for 500 ms or longer.

Also, in a conventional rare gas discharge lighting apparatus in which ON operations of the controlling IC which is part of the controlling circuit and the lamp are carried out by the same switch circuit, after an outside direct current power source (DC 24 V) is driven, the lamp cannot be turned on until voltage is raised to voltage at which the controlling IC can operate without any problems.

In view of the above described problems, an object of the present invention is to provide a rare gas discharge lamp lighting apparatus capable of preventing abnormal operations (i.e. melting of a current fuse of the rare gas discharge lamp lighting apparatus etc.) even though an ON signal of lamp ON/OFF signals is output at moment when DC 24 V is applied from a direct current power source, and capable of shortening risetime of a lamp by outputting an ON signal of the lamp ON/OFF signals and at the same time voltage of DC 24 V is applied.

According to the present invention, a rare gas discharge lamp lighting apparatus has a power supply, a transformer, a switching element which is in series connected to the power supply and a primary side of the transformer, a rare gas discharge lamp connected on a secondary side of the transformer, and an input terminal for inputting a lamp lighting signal, a controlling circuit for outputting a controlling signal to the switching circuit by calculating at least one of output voltage, output current and output power, and an operating voltage input terminal to which voltage is impressed to initiate an operation of the controlling circuit based on the lamp lighting signal, wherein a delay element is provided between the input terminal and the operating voltage input terminal.

In the rare gas discharge lamp lighting apparatus, a first controlling element may be connected between the power supply and the operating voltage input terminal, and the delay element may be provided between the input terminal and the first controlling element.

Also, in the rare gas discharge lamp lighting apparatus, a first controlling element may be connected between the power supply and the operating voltage input terminal, a second controlling element may be connected between a first controlling terminal of the first controlling element and ground, the input terminal may be connected to a second controlling terminal of the second controlling element, and the delay element may be connected between the second controlling element and the ground.

Further, the delay element may be a zener diode.

Furthermore, according to the present invention, a lamp lighting apparatus havs a transformer, a switching element connected to a primary side of the transformer, a lamp connected on a secondary side of the transformer, and an input terminal for inputting a lamp ON signal, a controlling circuit for outputting a controlling signal to the switching circuit, and an operating voltage input terminal to which voltage is impressed to initiate an operation of the controlling circuit based on the lamp lighting signal, wherein a delay element is provided between the input terminal and the operating voltage input terminal.

The present invention will become more apparent from the following detailed description of the embodiments and examples of the present invention. The reference characters in claims are attached just for convenience to clearly show correspondence with the drawings, which are not intended to limit the present invention to the configurations shown in the accompanying drawings.

DESCRIPTION OF THE DRAWINGS

The present inventions will now be described by way of example with reference to the following figures in which:

FIG. 3 is a diagram showing a sequence of each part of the rare gas discharge lamp lighting apparatus according to the present invention;

FIG. 4A shows a cross sectional view taken in a direction vertical to the axial direction of the rare glass discharge lamp;

FIG. 4B is a side elevational view thereof.

DETAILED DESCRIPTION OF THE INVENTION

The first embodiment of the present invention will be described referring to FIGS. 1 and 2.

Figure 1:
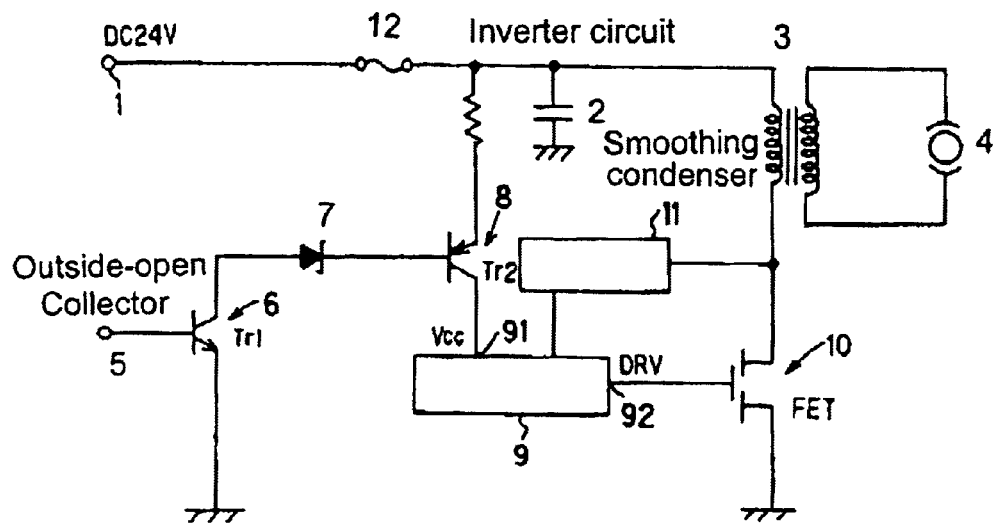
FIG. 1 is a diagram showing the structure of a rare gas discharge lamp lighting apparatus according to the first and second embodiments of the present invention.

FIG. 1 is a diagram showing the structure of a rare gas discharge lamp lighting apparatus according to the present invention.

As shown in FIG. 1, the rare gas discharge lamp lighting apparatus comprises a power source terminal 1 to which DC 24 V is applied from a direct current power supply apparatus (not shown), a smoothing condenser 2, a flyback transformer 3, a rare gas discharge lamp 4, an input terminal 5 in which lamp ON/OFF signals are input, a transistor 6 functioning as a second controlling element, a zener diode 7 provided for functioning as delay means, a transistor 8 functioning as a first controlling element, an FET 10 functioning as a switching element of an inverter circuit, a controlling circuit 9, comprising a controlling IC for starting an operation based on an lighting start signal input from the input terminal 5, processing output voltage, output current and output power, and outputting a gate signal to a gate of the FET 10, an operating voltage input terminal 91 in which voltage $V_{cc}$ for initiating an operation of the controlling circuit 9 is input, a DRV terminal 92 outputting a gate signal comprising rectangular waves to the gate of the FET 10 from the controlling circuit 9, a detecting circuit 11 for detecting drain voltage of the FET 10 and feeding it back to the controlling circuit 9 and a fuse 12.

As described referring to FIG. 4, the rare glass discharge lamp 4 comprises a discharge container made of dielectric such as glass, a pair of strip shaped electrodes made of aluminum and the like which are, in the tube axis direction, approximately entirely disposed on the side surface of the glass tube, and a fluorescent material layer formed on the discharge container.

Although the detecting circuit 11 is adopted to detect drain voltage of the FET 11, feedback control of lamp current or drain current and the like on the secondary side of the flyback transformer 3 and control such as feed-forward control based on input voltage may be used for the present invention.

The zener diode used as the delay means, has zener voltage which is more than that for initiating an operation of the controlling circuit. The embodiment is described above using the zener diode as the delay means, however, other delay means may be used for the present invention.

Figure 2:
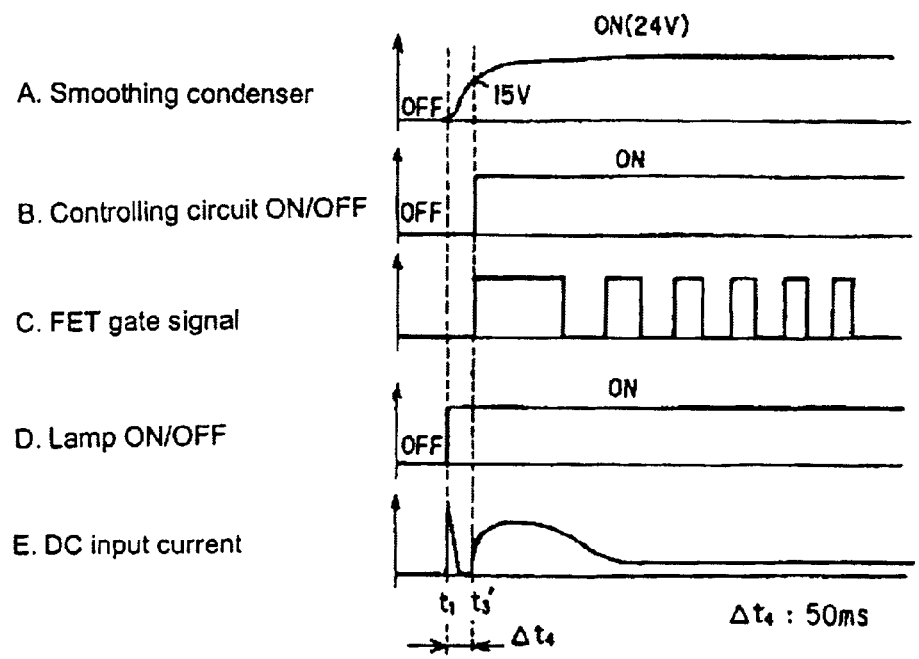
FIG. 2 is a diagram showing a sequence of each part of the rare gas discharge lamp lighting apparatus of according to the first and second embodiments of the present invention.
Figure 5:
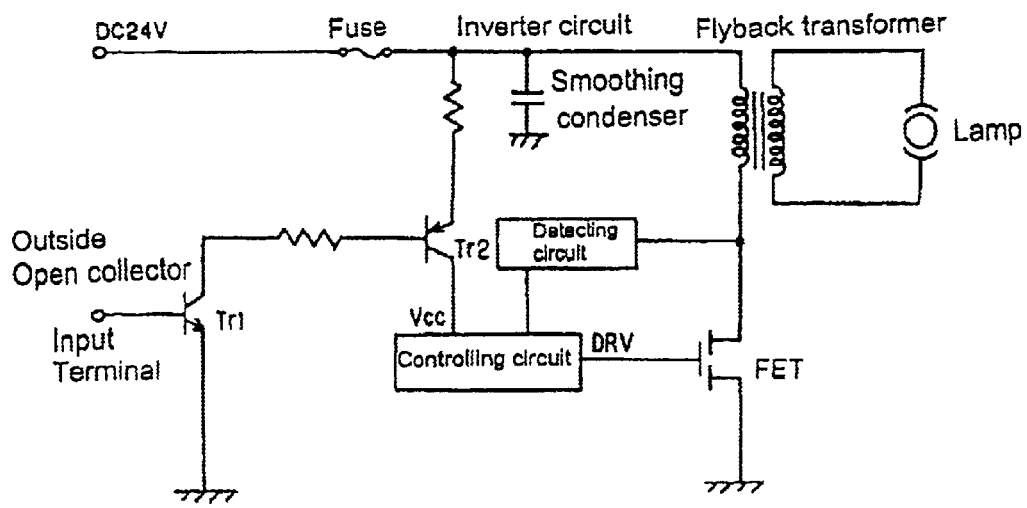
FIG. 5 is a diagram showing the structure of a conventional rare gas discharge lamp lighting apparatus.
Figure 6:
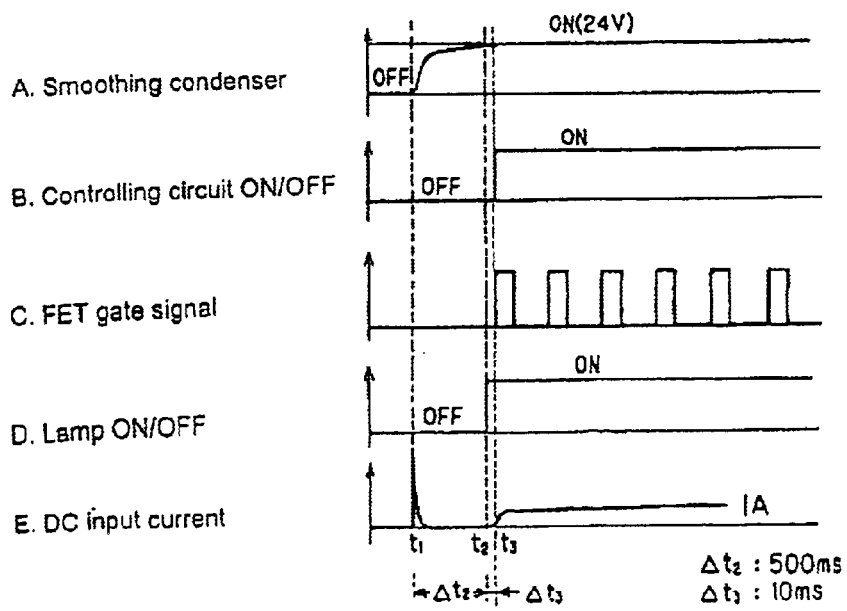
FIG. 6 a diagram showing a sequence of each part of the conventional rare gas discharge lamp lighting apparatus.
Figure 7:
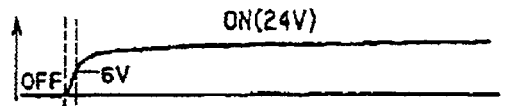
FIG. 7 is a diagram showing a sequence of each part of the conventional rare gas discharge lamp lighting apparatus in an abnormal operation when an ON signal of the lamp ON/OFF signals is input upon impression of DC 24 V.
Figure 7:
Figure 7:
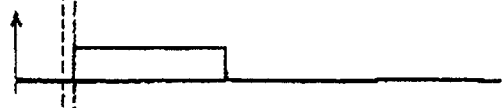
Figure 7:
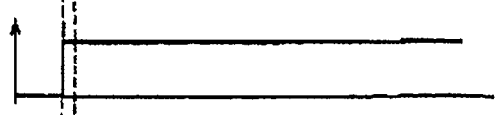
Figure 7:
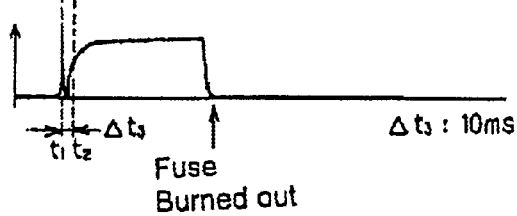

FIG. 2 is a chart showing a sequence of each part of the rare gas discharge lamp lighting apparatus according to the present invention.

Description of an operation of the rare gas discharge lamp lighting apparatus, will be given below.

As shown in FIG. 1, when DC 24 V is applied to the inverter circuit from the power source terminal 1, as shown as A in FIG. 2, voltage between both ends of the smoothing condenser 2 rises base on the time constant determined by impedance of the direct current power source apparatus (not shown), the inverter circuit, and the smoothing condenser 2 and the like, and charging voltage is obtained between the ends of the smoothing condenser 2.

To make the rare gas discharge lamp lighting apparatus work, as shown as D in FIG. 2, an ON signal of the lamp ON/OFF signal is input and at the same time, direct voltage, DC 24 V is input from the input terminal 5 of the open collector provided outside the inverter circuit.

When the ON signal of the lamp ON/OFF signals is input to the input terminal 5, although a signal of the transistor 6 falls to a low level, the transistor 8 does not turns on until the zener diode 7 turns on. As a result, the controlling circuit 9 does not operate. That is, as shown as B in FIG. 2, after the zener diode 7 turns on after a certain time $\Delta t_4$ delay because of the function of the zener diode 7, the transistor 8 turns on with delay and voltage $V_{cc}$ is input, with delay, to the operating voltage input terminal 91 of the controlling circuit 9, whereby an operation of the controlling circuit 9 starts.

When voltage $V_{cc}$ is applied to the operating voltage input terminal 91, an oscillation circuit provided in the controlling circuit 9 operates, and a gate signal is output to the gate of the FET 10 from the DRV terminal 92 of the controlling circuit 9 as shown as C in FIG. 2.

While a level of the gate signal is high, the FET 10 is on, and electromagnetic energy is accumulated on the primary side of the flyback transformer 3. Next, when the level of the gate signal becomes low, the electromagnetic energy stored in the primary side is discharged to the secondary side of the flyback transformer 3 at a moment the FET 10 turns off, whereby output voltage induced on the secondary side is impressed to the rare gas discharge lamp 4, and the rare gas discharge lamp 4 is lighted. After that, the FET 10 is feedback-controlled by the controlling circuit 9 based on output of the detecting circuit so that output voltage becomes a predetermined voltage. During that time, input current which is input in the inverter circuit is shown as E in FIG. 2.

When, as the above described zener diode 7, an element having, for example, 15 V zener voltage is used, the voltage $V_{cc}$ which is input to the operating voltage input terminal 91 of the controlling circuit 9 can be raised to 15 V. For that reason, in case that input voltage of the inverter circuit is DC 24 V and input current is set to 1 A, in order for the power to be the same as that in case of 15 V input voltage, input current of 1.6 A is used for such control, whereby it is possible to rapidly light the rare gas discharge lamp 4 and to stably operate the apparatus without causing excessive current which is more than rated current of the current fuse.

According to the present invention, since the delay time $\Delta t_4$ becomes approximately 50 ms, it is possible to shorten to one tenth risetime of the lamp of the conventional apparatus, that is 500 ms.

According to the present invention, it is possible to solve the problem in the prior art that after outside direct current power source (DC 24 V) is driven, the lamp cannot be turned on until voltage is raised to voltage at which the controlling IC can operate without any problems since the ON operations of the controlling IC which is part of the controlling circuit and the lamp are carried out by the same switch circuit whereby the lamp cannot be rapidly lighted. Therefore, according to the present invention, since a delay means is provided between the input terminal for the lamp ON operation and the controlling IC wherein only an operation of the controlling IC is delayed, it is possible to carry out an ON operation of the lamp prior to driving of the controlling IC whereby it is possible to shorten risetime of the lamp.

Next, description of the second embodiment will be described below referring to FIG. 3.

FIG. 3 is a diagram showing a sequence of each part of the rare gas discharge lamp lighting apparatus of the second embodiment according to the present invention.

As shown in FIG. 3, a zener diode 13 is connected between the emitter of the transistor 6 and the ground. Other components of the rare gas discharge lamp lighting apparatus according to the second embodiment corresponds to that of the first embodiment, therefore, explanation thereof will be omitted.

Next, The first embodiment of the present invention will be described referring to FIGS. 2 and 3.

As shown in FIG. 3, when DC 24 V is applied to the inverter circuit from the power source terminal 1, as shown as A in FIG. 2, voltage between both ends of the smoothing condenser 2 rises based on the time constant determined by impedance of the inverter circuit, and the like, and charging voltage is obtained between both ends of the smoothing condenser 2.

To make the rare gas discharge lamp lighting apparatus work, as shown as D in FIG. 2, an ON signal of the lamp ON/OFF signals is input at the same time as that direct voltage, DC 24 V is input from the input terminal 5 of the open-collector provided outside the inverter circuit.

When the ON signal of the lamp ON/OFF signals is input to the input terminal 5, the transistor 6, that is, the second controlling element, does not turn on until the zener diode 13 turns on. As a result, the transistor 8, that is, the first controlling element, and the controlling circuit 9 do not operate, either. That is, as shown B in FIG. 2, after the zener diode 13 turns on after a certain time $\Delta t_4$ delay because of the function of the zener diode 13, the transistors 6 and 8 turn on with delay and also voltage $V_{cc}$ is input, with delay, to the operating voltage input terminal 91 of the controlling circuit 9, whereby an operation of the controlling circuit 9 starts.

When voltage $V_{cc}$ is applied to the operating voltage input terminal 91, an oscillation circuit provided in the controlling circuit 9 operates, and a gate signal is output to the gate of the FET 10 from the DRV terminal 92 of the controlling circuit 9 as shown as C in FIG. 2.

After this, the operation of this apparatus is the same as the first embodiment of the present invention, Therefore, the explanation is omitted.

Thus, according to the second embodiment of the present invention, as well as the first embodiment, it is possible to light the rare gas discharge lamp at the same time as that direct current power source voltage, DC 24 V is applied, and to stably operate the rare gas discharge lamp lighting apparatus without causing excessive current more than rated current of the current which is fuse.

Although in the above described embodiments, the example that input voltage is DC 24 V, is described, higher voltage may be used as input voltage. Also the system in which drain voltage is detected for controlling, is described, but other factors, such as drain current, lamp current may be used.

According to the present invention, since, by providing delay means, it is possible to operate the controlling circuit after voltage of the operating voltage input terminal reach a certain voltage, it is possible to prevent an abnormal operation of the rare gas discharge lamp lighting apparatus even though an ON signal of the lamp ON/OFF signals is output at the same time as that current power source voltage is applied, and to shorten risetime of the lamp.

Also, it is possible to form delay means by using a zener diode as the delay means.

The disclosure of Japanese Patent Application No. 2002-266257 filed on Sep. 12, 2002 including specification, drawings and claims is incorporated herein by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A rare gas discharge lamp lighting apparatus having a power supply, a transformer, a switching element which is in series connected to the power supply and a primary side of the transformer, a rare gas discharge lamp connected on a secondary side of the transformer, and an input terminal for inputting a lamp lighting signal, a controlling circuit for outputting a controlling signal to the switching circuit by calculating at least one of output voltage, output current and output power, and an operating voltage input terminal to which voltage is impressed to initiate an operation of the controlling circuit based on the lamp lighting signal, wherein a delay element is provided between the input terminal and the operating voltage input terminal.

2. The rare gas discharge lamp lighting apparatus according to claim 1, wherein a first controlling element is connected between the power supply and the operating voltage input terminal, and the delay element is provided between the input terminal and the first controlling element.

3. The rare gas discharge lamp lighting apparatus according to claim 1, wherein a first controlling element is connected between the power supply and the operating voltage input terminal, a second controlling element connected between a first controlling terminal of the first controlling element and ground, the input terminal connected to a second controlling terminal of the second controlling element, and the delay element connected between the second controlling element and the ground.

4. The rare gas discharge lighting apparatus according to claim 1, the delay element is a zener diode.

5. The rare gas discharge lighting apparatus according to claim 2, the delay element is a zener diode.

6. The rare gas discharge lighting apparatus according to claim 3, the delay element is a zener diode.

7. A lamp lighting apparatus having a transformer, a switching element connected to a primary side of the transformer, a lamp connected on a secondary side of the transformer, and an input terminal for inputting a lamp ON signal, a controlling circuit for outputting a controlling signal to the switching circuit, and an operating voltage input terminal to which voltage is impressed to initiate an operation of the controlling circuit based on the lamp lighting signal, wherein a delay element is provided between the input terminal and the operating voltage input terminal.

8. The lamp lighting apparatus according to claim 7, further including a power supply terminal and a first controlling element wherein the first controlling element is connected between the power supply terminal and the operating voltage input terminal, and the delay element is provided between the input terminal and the first controlling element.

9. The lamp lighting apparatus according to claim 7, further including a power supply terminal, a first controlling element and a second controlling element wherein the first controlling element is connected between the power supply terminal and the operating voltage input terminal, the second controlling element connected between a first controlling terminal of the first controlling element and ground, the input terminal connected to a second controlling terminal of the second controlling element, and the delay element connected between the second controlling element and the ground.

10. The lamp lighting apparatus according to claim 7, the delay element is a zener diode.

11. The lamp lighting apparatus according to claim 8, the delay element is a zener diode.

12. The lamp lighting apparatus according to claim 9, the delay element is a zener diode.

13. The lamp lighting apparatus according to claim 7, wherein direct current power voltage and the lamp ON signal applied to the power supply terminal and the input terminal respectively at the same time.

* * * * *